Oct. 17, 1950   J. M. CROFOOT   2,525,870
BALED HAY LOADER
Filed Jan. 27, 1947   2 Sheets-Sheet 1
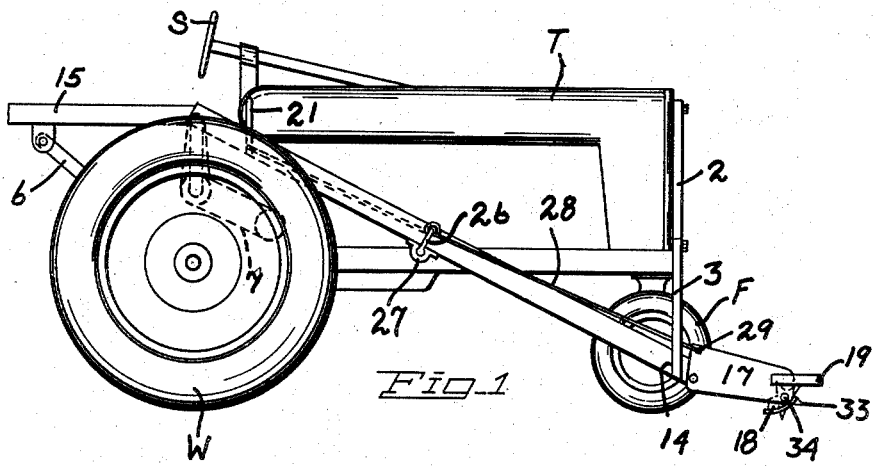
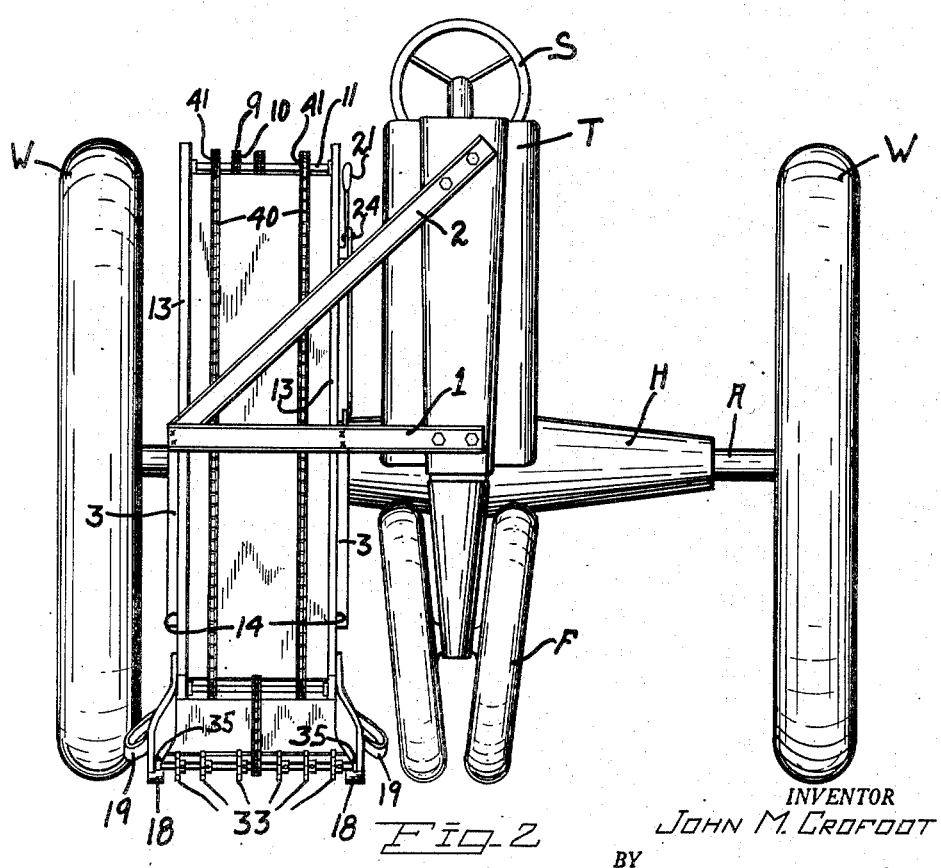
INVENTOR
JOHN M. CROFOOT
BY
Glenn L. Fish
ATTORNEY

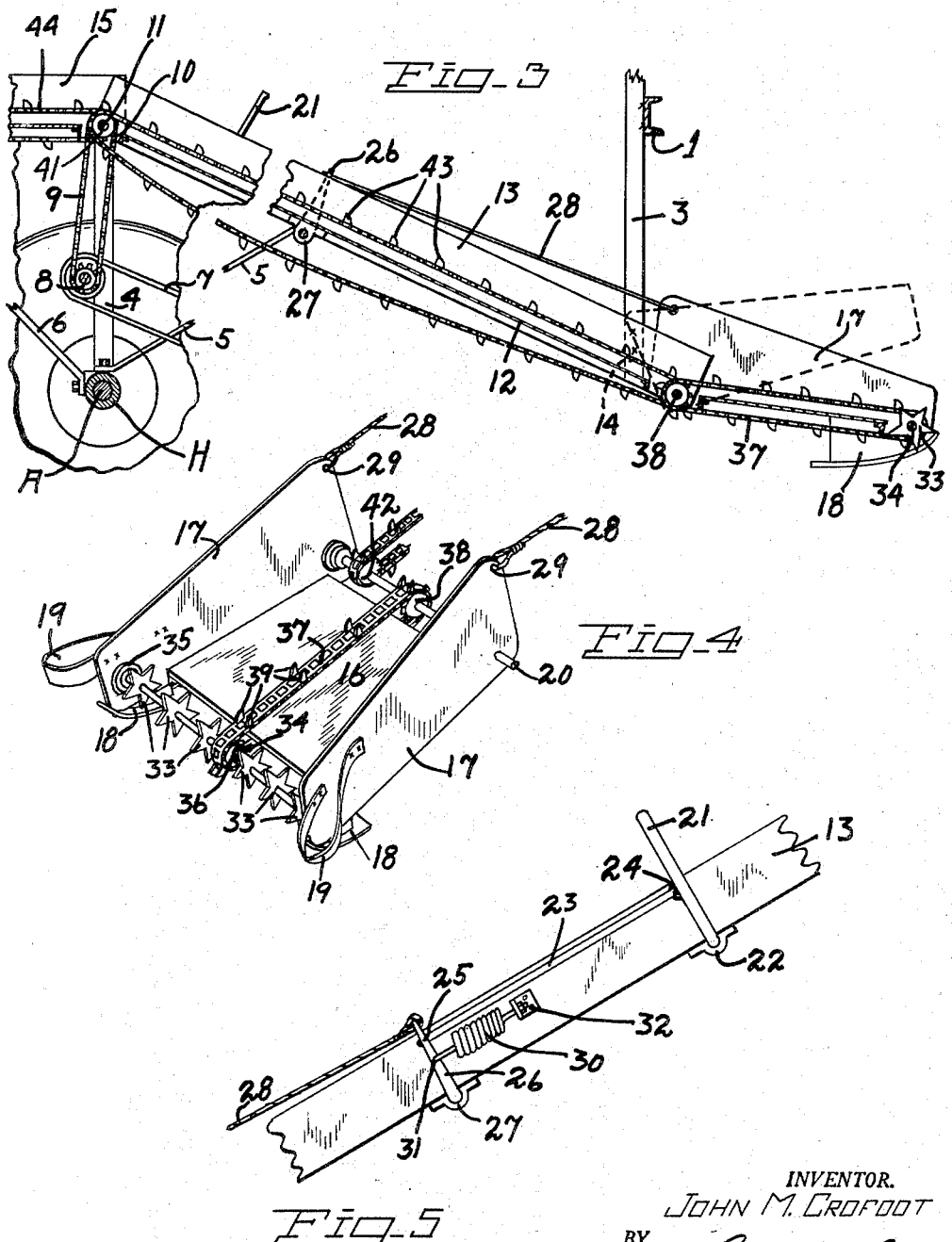

Patented Oct. 17, 1950

2,525,870

UNITED STATES PATENT OFFICE 2,525,870

BALED HAY LOADER

John M. Crofoot, Mead, Wash.

Application January 27, 1947, Serial No. 724,593

2 Claims. (Cl. 198—9)

My present invention relates to the general class of loading and conveying machines, as an attachment for automotive vehicles, and more specifically to an improved baled hay loader of the type adapted to be mounted upon, and operated by power taken off, a conventional automotive tractor or similar vehicle, for successively picking up bales of hay from the field and preferably conveying the bales to a trailer or other implement, for collection of or gathering the bales from the field and transporting them to a desired destination.

The primary object of the invention is the provision of a loading and conveying mechanism adapted for use on conventional tractors or other standard automotive vehicles, which mechanism is made up of a minimum number of parts that may with facility be manufactured at low cost of production and assembled with convenience to provide an attachment that may readily be installed for use on the tractor. By means of the tractor so equipped the bales of hay may successively be picked up from the field with reliability and dispatch, and then disposed of as desired.

The invention consists in certain novel features of construction and combinations and arrangements of parts as will hereinafter be described, and more specifically set forth in my appended claims.

In the accompanying drawings I have illustrated a complete example of a physical embodiment of my invention wherein the parts are combined and arranged in accord with one mode I have devised for the practical application of the principles of my invention. While I have illustrated and described the invention as embodied in a baled hay loader, it will be understood that the loading mechanism may be adapted for handling similar loads of other material; and changes and alterations are contemplated and may be made in these exemplifying drawings and mechanical structures, within the scope of my claims, without departing from the principles of the invention.

Figure 1 is a view in side elevation of an implement including a conventional tractor to which the structure of my invention is attached; and Figure 2 is a front elevation of the implement in Fig. 1.

Figure 3 is an enlarged detail vertical longitudinal sectional view of my loading mechanism, showing a portion of the tractor and the power take-off mechanism.

Figure 4 is a perspective view of the loading head detached from the other parts; and Figure 5 is a fragmentary side view in elevation showing the control lever-mechanism for the loading head.

In order that the general arrangement of parts and the utility of the invention may readily be understood I have illustrated a standard type of tractor T having the usual wheels W and steering mechanism S for the front steering wheels F, and the axle A is mounted as usual in the tubular housing H.

In equipping the tractor with the attachment of my invention I preferably utilize a front frame including a horizontal arm or channel iron 1 that is rigidly bolted to the tractor and braced by a diagonal brace 2 also fixed to an upper part of the tractor, and a pair of spaced upright legs 3, 3 rigidly depend from the horizontal frame member 1.

A rear frame for the attachment is supported from the axle housing H and this frame includes a pair of vertical arms 4, 4, which are rigidly mounted on the housing, a front pair of diagonal braces 5, 5, and a pair of rearwardly extending diagonal braces 6, 6, all of which are rigidly united to provide a substantial support for the operating mechanism of the loader.

For operating the loading mechanism power may be taken from a suitable drive shaft and control mechanism of the tractor to a drive belt 7 in Fig. 3, and an operating sprocket 8 and chain 9 convey power to the upper sprocket 10 on the power shaft 11 that is journaled transversely of the tractor in the upper part of the rear supporting frame.

The rear upper end of a guiding chute for the bales of hay is supported on this power shaft, and the chute, which includes a flat bottom 12 and side walls 13, 13, declines toward the front of the tractor with its lower end rigidly supported at 14 on the lower ends of the legs 3, 3.

A rearwardly extending horizontal unloading platform or shelf 15 is also supported at its front end by the frame-supported power shaft 11, and this unloading platform is supported in rigid position by the members 6 on the rear frame.

The front lower end of the forwardly declining conveyor chute terminates at a slight elevation above the ground level, and a loading head, in the nature of a scoop is pivotally mounted at the lower end of the chute, and its position is manually controlled for picking up and loading a bale of hay for conveyance up the inclined chute.

As best seen in Fig. 4 the loading head is constructed with a flat bottom 16 and two side walls 17, 17, and the front end of the head is equipped with a pair of sliding shoes 18, 18, which may be resilient, and are adapted to glide along the ground surface in loading operations. The bale of hay to be picked up is guided inwardly through the open front end of the loading head by means of a pair of looped resilient guides 19, 19, attached on the outer sides of the side walls of the head.

At its rear end the loading head is pivotally mounted on the lower front end of the chute 12—13 through the use of a driven shaft 20 that is journalled in bearings of the chute and of the head, in order that the head may be lifted or elevated from the ground surface, and also lowered to the ground surface for picking up a bale of hay.

This lifting and lowering movement of the loading head is controlled, manually, by means of a hand lever 21 located in position where it is readily accessible for the driver of the tractor, and it is pivotally supported in a bearing bracket 22 fixed at the under side of one of the chute walls 13. A link 23 is pivoted at 24 on the lever 21, and also pivoted at 25 on one arm 26 forming part of a U-shaped yoke that is journaled in bearing brackets 27, beneath the chute with the two arms 26, extending upwardly and exteriorly of the chute. From the upper free end of each arm 26 a rope or chain 28 is extended and the forward ends of the chains or ropes are attached at 29, 29, to the rear ends of the side walls 17, 17 of the loading head.

The front end of the loading head is resiliently supported, just above the ground level by means of a pair of helical springs 30, 30, each having one end connected at 31 to an arm 26 of the yoke, and its other end connected to an anchoring bracket 32 fastened on the outer side of the chute wall 13. Thus, by means of a push on the lever 21 in Fig. 5 the springs 30, 30 are placed under tension as the arms 26, 26 are swung forwardly, and the chains or ropes 28 are slackened to permit the front end of the loading head to fall by gravity and rest upon the resilient shoes 18, 18, in position for picking up a bale from the ground surface, as the tractor advances.

Guided by the resilient loops 19, 19, as the loading head pushes into the bale, the operation of picking up the bale is facilitated by the use of a number of starwheels 33 that are rigidly mounted and longitudinally spaced upon a rotary spindle 34 which extends transversely across the front lower end of the loading head and is journaled in bearings 35 mounted on the side walls of the head.

The pick-up spindle is revolved by means of a chain drive including a driven sprocket 36 on the spindle, a chain 37 and a sprocket on the pivot shaft 20 indicated at 38. The star wheels are thus made to turn upwardly and over toward the interior of the loading head as they engage the exterior surface of a bale near the ground surface, and the bale is guided into the open loading head. At this time the bale of hay is caught by spaced hooks 39 of the chain 37 and thus conveyed to the rear end of the loading head, and delivered to an endless conveyor mounted on the inclined chute.

This conveyor includes a pair of drive chains 40 that are driven from the power shaft 11 by means of sprocket wheels 41, and the chains pass downwardly under the chute, around sprocket wheels 42 on the pivot shaft 34, and then upwardly to the rear over the flat bottom 12 of the chute.

Both of these drive chains 40, 40, are utilized as endless conveyors for the bale of hay, and the chains are equipped with hooks 43 arranged so that the hooks on the upper or working flight of the chain will engage the material of the bale and assist in elevating the bale up to and over the power shaft 11, to the shelf or unloading platform 15.

As indicated in Fig. 3 the unloading platform may be equipped with another endless conveyor, as 44, that is operated from the power shaft 11, and by means of this horizontal conveyor the successive bales may be delivered to a trailer; or, if desired the bales delivered to the platform may be manually transferred from the platform or shelf and disposed of in desired manner.

Having thus fully described my invention, what I claim as new and desire to secure by Letters Patent is:

1. In a loading machine including a frame, a power shaft journaled therein, a forwardly declining chute having bearings for the shaft and supported on the frame, and an open loading head pivotally mounted on the chute, of a rocking yoke pivotally mounted on the chute and flexibly connected with the head, a spring uniting the yoke with the chute and tending to lift the head from the ground surface, a manually operated lever linked to the yoke for lowering the head to the ground surface, an endless conveyor mounted on the head, an endless conveyor mounted on the chute, and means for transmitting power from the power shaft to said conveyors.

2. In a baled hay loader, the combination with a supporting frame, a power shaft journaled therein, a forwardly declining chute supported on the shaft and frame, a loading head having a pivotal shaft journaled in the lower end of the chute, a pick-up shaft journaled at the front of the loading head and pick-up devices rotatable with the shaft, and resilient supporting shoes attached to and located under the front end of the head, of resilient means on the chute tending to elevate the head and manually controlled means for lowering the head, a pair of endless drive chains connecting the power shaft and the pivot shaft and conveyor hooks on said chains, a drive chain connecting the pivot shaft and the pick-up shaft, and conveyor hooks on the last mentioned drive chain.

JOHN M. CROFOOT.

REFERENCES CITED

The following references are of record in the file of this patent:

UNITED STATES PATENTS

| Number | Name | Date |
| --- | --- | --- |
| 1,747,607 | Strodthoff | Feb. 18, 1930 |
| 1,853,253 | Bennett | Apr. 12, 1932 |
| 2,174,605 | Spencer, Jr. | Oct. 3, 1939 |
| 2,402,465 | Templeton | June 18, 1946 |
| 2,427,324 | Farr et al. | Sept. 9, 1947 |